United States Patent [19]
Satoh et al.

[11] Patent Number: 5,478,499
[45] Date of Patent: Dec. 26, 1995

[54] LOW-VELOCITY ELECTRON EXCITED PHOSPHOR OF BLUE LUMINOUS COLOR

[75] Inventors: Yoshitaka Satoh; Hitoshi Toki, both of Mobara, Japan

[73] Assignee: Futaba Denshi Kogyo K.K., Chiba, Japan

[21] Appl. No.: 248,044

[22] Filed: May 24, 1994

[30] Foreign Application Priority Data

May 31, 1993 [JP] Japan ................................. 5-129500

[51] Int. Cl.$^6$ ............................ C09K 11/54; C09K 11/62
[52] U.S. Cl. ............................ 252/301.6 P; 252/301.6 R; 252/301.4 P
[58] Field of Search ............... 252/301.4 P, 301.6 R, 252/301.6 P, 301.4 R; 106/425, 427

[56] References Cited

U.S. PATENT DOCUMENTS 5,051,203   9/1991   Toki et al. ...................... 252/301.6 R

*Primary Examiner*—C. Melissa Bonner
*Attorney, Agent, or Firm*—Fisher & Associates

[57] ABSTRACT

A low-velocity electron excited phosphor capable of exhibiting increased luminance and a stabilized blue tone. The phosphor is formed of $ZnO.Ga_2O_3$ doped with Li and P, wherein the Li and P are doped in amounts of 500 to 2300 ppm and 100 ppm or less, respectively. Such construction permits the phosphor to exhibit a blue luminous color of a desirable tone having a value y of 0.05 to 0.25 in a CIE chromaticity diagram.

2 Claims, 5 Drawing Sheets

5,478,499

LOW-VELOCITY ELECTRON EXCITED PHOSPHOR OF BLUE LUMINOUS COLOR

BACKGROUND OF THE INVENTION

This invention relates to a low-velocity electron excited phosphor of a blue luminous color, and more particularly to a low-velocity electron excited phosphor capable of exhibiting a blue luminous color at an anode voltage as low as 100 V or less in a fluorescent display device, a fluorescent luminous device, a write head for a printer, a back light for liquid crystal or the like.

The assignee proposed a phosphor of a blue luminous color which is constructed in such a manner that a matrix represented by a formula $ZnO.GaO_2$ is doped with Li and P, as disclosed in Japanese Patent Application No. 331358/1987.

In the phosphor proposed, the matrix is formed by mixing ZnO and $Ga_2O_3$ with each other in equivalent moles and then subjecting the resultant mixture to burning in an air atmosphere. Then, $Li_3PO_4$ is added to the matrix thus obtained, followed by secondary burning of the matrix in a reducing atmosphere, to thereby permit the matrix to be doped with Li and P, resulting in preparing the phosphor.

The above-described procedure wherein ZnO and $Ga_2O_3$ are mixed together in equivalent moles and then the resultant mixture is burned in an air atmosphere would lead to formation of a desired $ZnO.Ga_2O_3$ matrix. Unfortunately, the burning in an air atmosphere causes Zn in ZnO to be evaporated due to decomposition, to thereby substantially fail to provide the matrix of a constant composition.

Also, the secondary burning in a reducing atmosphere after addition of $Li_3PO_4$ in an amount as much as $5\times10^{-3}$ to $4\times10^{-1}$ mol per mol of the matrix causes the phosphor synthesized to exhibit only a tone of blue inclining to purple.

The inventors made an analysis of the conventional phosphor described above in order to solve such problems. As a result, it was found that the quantity of Li acting as an activator which is contained in the phosphor is as low as 500 ppm or less. The reason would be that ZnO was charged in a relatively large amount for synthesis of the matrix because of being easy to be evaporated. Charging of ZnO in a large amount causes ZnO which is not changed to a solid solution to remain even during the secondary burning. Thus, substitution between Zn and Li takes place under the conditions that Zn is present in an amount sufficient to render the replacement difficult. This results in the phosphor prepared being deteriorated in luminance and exhibiting a tone of blue inclining to purple due to an increase in component of a short wavelength of the tone.

SUMMARY OF THE INVENTION

The present invention has been made in view of the foregoing disadvantage of the prior art.

Accordingly, it is an object of the present invention to provide a low-velocity electron excited phosphor which is capable of possessing a blue luminous tone and exhibiting increased luminance.

In accordance with the present invention, a phosphor is provided. The phosphor comprises a matrix represented by a general formula $ZnO.Ga_2O_3$, and Li and P doped in the matrix. Li is doped in an amount of 500 to 2300 ppm and P is doped in an amount of 100 ppm or less.

In a preferred embodiment of the present invention, a molar ratio of $Ga_2O_3$ to ZnO in the $ZnO.Ga_2O_3$ matrix which is determined by analysis may be in a range of 0.73–0.93:1.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a phosphor according to the present invention will be described hereinafter with reference to the accompanying drawings.

A low-velocity electron excited phosphor of a blue luminous color which is an embodiment of the present invention comprises a matrix represented by a general formula $ZnO.Ga_2O_3$, and Li and P each doped in the matrix, wherein Li is doped in an amount of 500 to 2300 ppm and P is doped in an amount of 100 ppm or less.

Now, a process for preparing the low-velocity electron excited phosphor and characteristics thereof will be described with reference to FIGS. 1 to 6.

Figure 1:
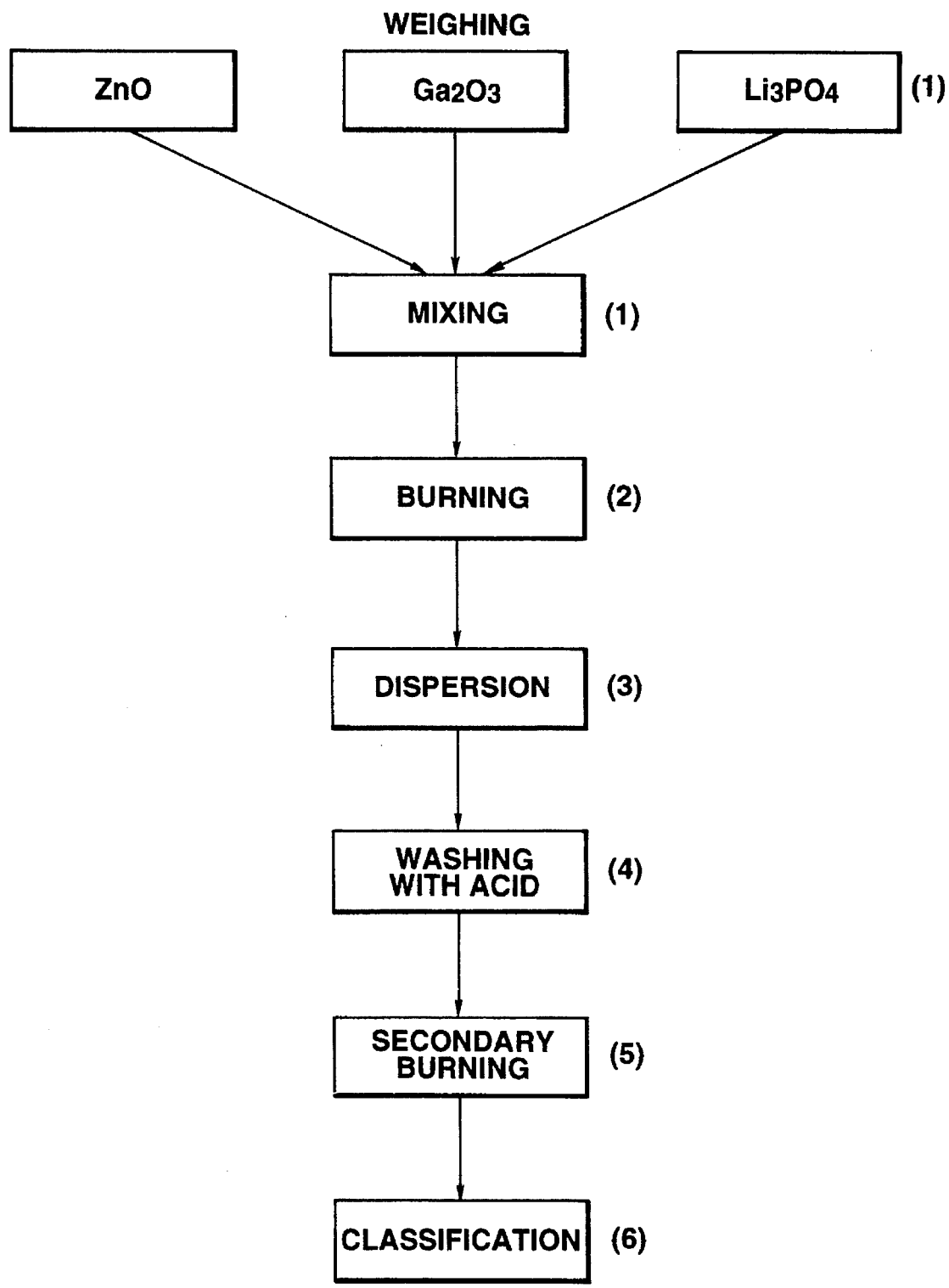
FIG. 1 is a flow chart showing a process of preparation of an embodiment of a phosphor according to the present invention.

First, a procedure of the process will be described according to steps (1) to (6) shown in FIG. 1.

(1) Weighing and Mixing

For preparation of the matrix, ZnO and $Ga_2O_3$ are mixed with each other at each of mixing ratios shown in TABLE 1. Concurrently, a Li compound which acts as a flux is mixed in each of amounts shown in TABLE 2, to thereby obtain a mixture.

TABLE 1

| Mixing Ratio $ZnO/Ga_2O_3$ (mol) | ZnO (g) | $Ga_2O_3$ (g) |
| --- | --- | --- |
| 0.5/1 | 8.1 | 37.4 |
| 0.7/1 | 11.4 | 37.4 |

TABLE 1-continued

| Mixing Ratio ZnO/Ga$_2$O$_3$ (mol) | ZnO (g) | Ga$_2$O$_3$ (g) |
|---|---|---|
| 0.91/1 | 14.8 | 37.4 |
| 0.94/1 | 15.3 | 37.4 |
| 0.97/1 | 15.8 | 37.4 |
| 1.0/1 | 16.3 | 37.4 |
| 1.05/1 | 17.1 | 37.4 |
| 1.1/1 | 17.9 | 37.4 |
| 1.2/1 | 19.6 | 37.4 |
| 1.5/1 | 24.5 | 37.4 |
| 2.0/1 | 32.6 | 37.4 |

TABLE 2

| Li Compound (mol %/mol) | Li$_3$PO$_4$ (g) |
|---|---|
| 0.05 | 0.0116 |
| 0.5 | 0.116 |
| 1 | 0.232 |
| 5 | 1.16 |
| 10 | 2.32 |
| 20 | 4.64 |
| 30 | 6.96 |
| 40 | 9.28 |
| 50 | 11.6 |
| 60 | 13.9 |

TABLE 3

| Mixing of Starting Materials | | Quantitative Analysis of Phosphor | | | |
|---|---|---|---|---|---|
| | Li$_3$PO$_4$ | | Li | | |
| ZnO/Ga$_2$O$_3$ (mol) | (mol %/mol) | ZnO/Ga$_2$O$_3$ (mol) | (ppm) | (mol %) | P (ppm) |
| 0.90/1 | 40 | 0.730/1 | 2300 | 8.97 | 69 |
| 0.91/1 | 40 | 0.751/1 | 2000 | 7.80 | 72 |
| 0.97/1 | 40 | 0.831/1 | 1100 | 4.29 | 68 |
| 1.0/1 | 40 | 0.873/1 | 800 | 3.12 | 59 |
| 1.0/1 | 10 | 0.893/1 | 640 | 2.50 | 58 |
| 1.0/1 | 20 | 0.864/1 | 950 | 3.70 | 65 |
| 1.2/1 | 10 | 0.933/1 | 580 | 2.26 | 62 |
| 1.3/1 | 10 | 0.950/1 | 500 | 1.95 | 59 |
| 1.5/1 | 10 | 0.978/1 | 350 | 1.37 | 48 |

Li$_3$PO$_4$ may be used as the Li compound. The starting materials described above are mixed in a dry manner in a polymer vessel charged with glass beads while being subject to rolling together with the beads. Alternatively, the mixing may be carried out in a wet manner using pure water, solvent or the like. Alternatively, the mixing may be carried out in such a manner that the starting materials for the matrix are previously mixed together by coprecipitation or the like, followed by mixing of the flux.

(2) Burning

Then, burning is carried out on the resultant mixture. More particularly, the mixture is placed in a heat-resistant vessel such as an aluminum crucible or the like and then subject to burning at a temperature of 1200°C. for 3 hours in an air atmosphere to synthesize the matrix ZnO.Ga$_2$O$_3$. The burning permits substitution between Zn and Li to be carried out, during which Li$_3$PO$_4$ acts as a flux, to thereby promote formation of ZnO and Ga$_2$O$_3$ into ZnGa$_2$O$_3$ by synthesis, resulting in improving crystallizability thereof and incorporation of P therein. P generally adversely affects a cathode filament, therefore, a content of P in the matrix is desired to be 100 ppm or less. Thus, it is required to evaporate P during the burning to decrease the P content.

(3) Dispersion

Subsequently, dispersion of the matrix takes place. More particularly, the matrix thus synthesized is placed in a ball mill or a vessel made of a polymer material and then subject to rolling together with glass beads, to thereby disperse particles of the matrix agglomerated.

(4) Washing with Acid

Excessive Li causes substitution between Li and Zn during a subsequent secondary burning step to excessively proceed. In order to avoid the problem, the particles of the matrix dispersed are washed with 0.5 N nitric acid to remove an excess of Li$_3$PO$_4$.

(5) Secondary Burning

The matrix thus washed is placed in a heat-resistant vessel such as an aluminum boat or the like and then subject to secondary burning at 1100°C. for 1 to 3 hours in a reducing atmosphere containing H$_2$ gas and N$_2$ gas at a ratio of H$_2$:N$_2$= 1:5 to 1:4, to thereby activate the matrix. The secondary burning causes a trace amount of P remaining in the matrix to be doped therein.

(6) Classification

The matrix which was subject to the secondary burning is then subject to classification using a sieve, to thereby obtain the phosphor of the present invention.

The phosphor prepared as described above was subject to quantitative determination by atomic-absorption spectroscopy, to thereby analyze elements of the phosphor. The results were as shown in TABLE 3. In TABLE 3, a lowermost column indicates a prior art for comparison.

A ZnO/Ga$_2$O$_3$ ratio which is determined by analysis is varied depending on a mixing ratio between ZnO and Ga$_2$O$_3$. In the illustrated embodiment, washing of the flux is carried out using acid, to thereby cause Zn contained in ZnGa$_2$O$_4$ to be dissolved, so that a content of Zn therein is reduced to a level below the mixing ratio.

Figure 2:
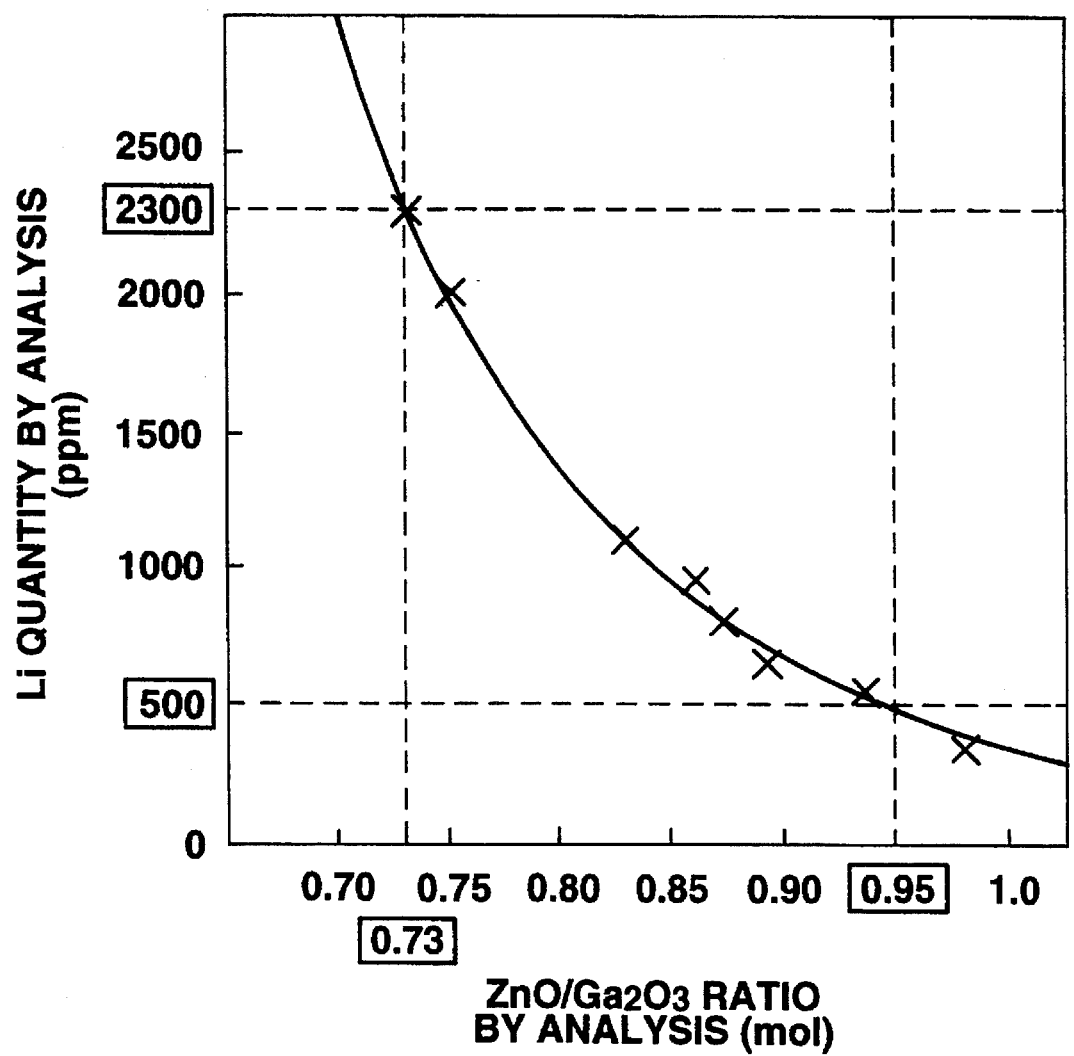
FIG. 2 is a graphical representation showing a relationship between a $ZnO/Ga_2O_3$ ratio in a phosphor of the present invention which is determined by analysis and a content of Li in the phosphor determined by analysis.

A content of Li in the matrix which is determined by analysis is varied depending on the quantity of the Li compound mixed. Also, it is substantially varied depending on a ZnO/Ga$_2$O$_3$ ratio mixed. More particularly, when a content of ZnO in the matrix is reduced to cause a molar ratio of ZnO to Ga$_2$O$_3$ to be 0.7:1 as shown in FIG. 2, a content of Li in the matrix is increased to 2300 ppm. When the Zn content is increased to a level of 0.95 mol, the Li content is decreased to 500 mols. Such a phenomenon occurs even during the secondary burning, resulting in addition and mixing of ZnO leading to a decrease in Li.

Figure 3:
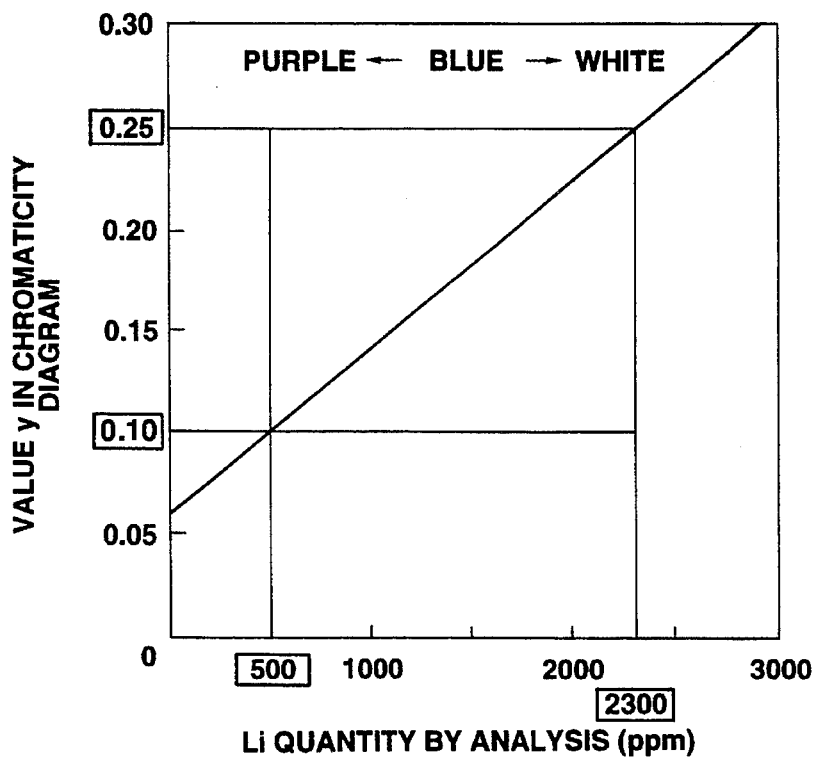
FIG. 3 is a graphical representation showing a relationship between a content of Li in a phosphor of the present invention which is determined by analysis and a value y in a CIE chromaticity diagram of the phosphor.

A display device was made on an experimental basis using the phosphor prepared as described above, resulting in evaluating luminous characteristics of the display device. The results were as shown in FIGS. 3 to 5.

The results indicate that a content of Li in the phosphor participates in luminescence of the phosphor. More particularly, an increase in Li content leads to an increase in long wavelength component of a luminous tone of the phosphor, so that luminance of the phosphor is increased as shown in FIG. 7 and its tone tends to change from a blue luminous color to a white luminous color. On the contrary, a decrease in Li content causes a short wavelength component of the luminous tone to be increased, resulting in the luminance being reduced and the tone tending to change from blue to purple.

In order to permit the phosphor of the illustrated embodiment to act as a satisfactory phosphor of a blue luminous color, it is desired that the phosphor has a value x of 0.08 to 0.20 and a value y of 0.05 to 0.025 in a CIE chromaticity diagram. For this purpose, the phosphor preferably has a Li content of 2300 ppm or less as shown in FIG. 3.

Figure 4:
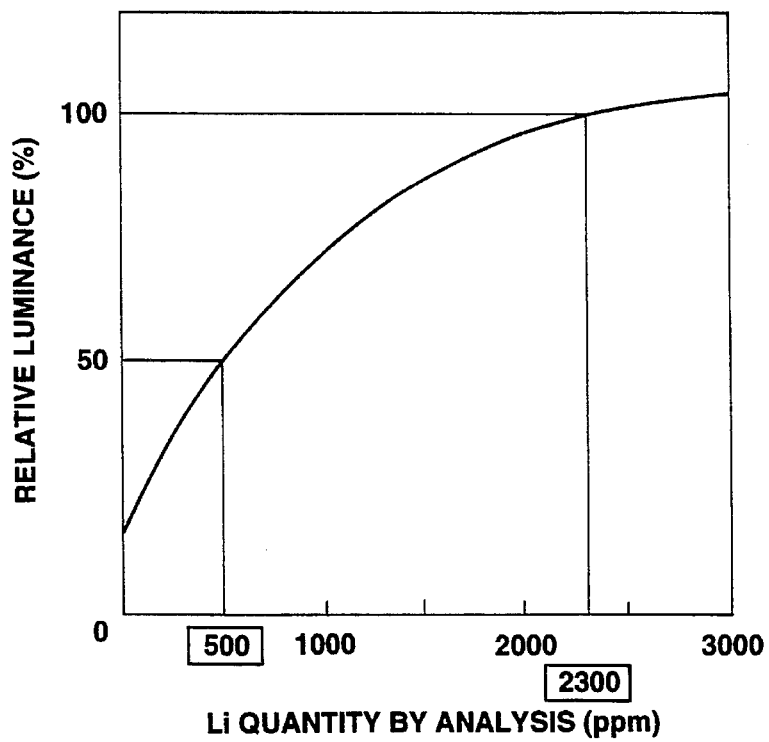
FIG. 4 is a graphical representation showing a relationship between a content of Li in a phosphor of the present invention which is determined by analysis and relative luminance of the phosphor.
Figure 5:
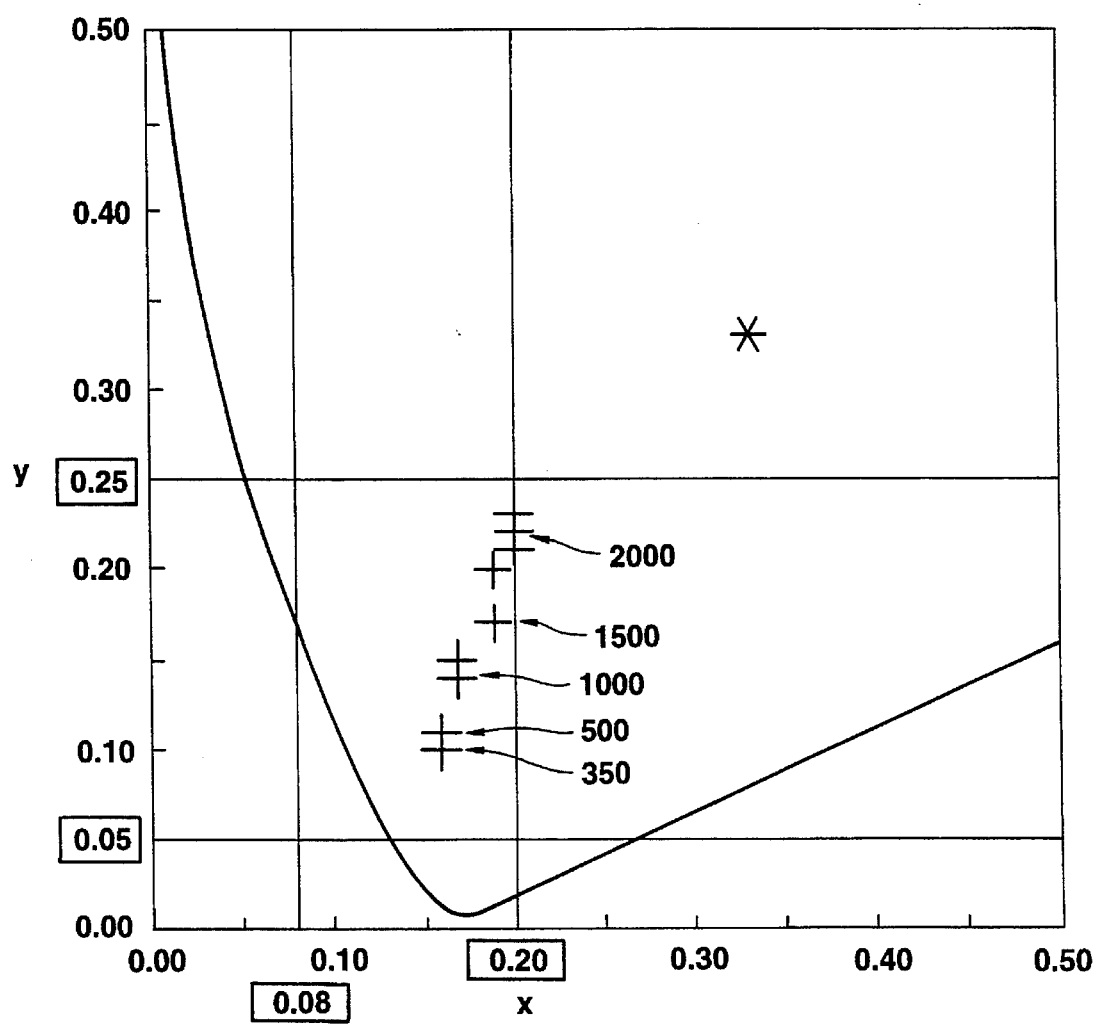
FIG. 5 is a graphical representation showing a relationship between a content of Li in a phosphor of the present invention which is determined by analysis and a CIE chromaticity diagram of the phosphor.
Figure 6:
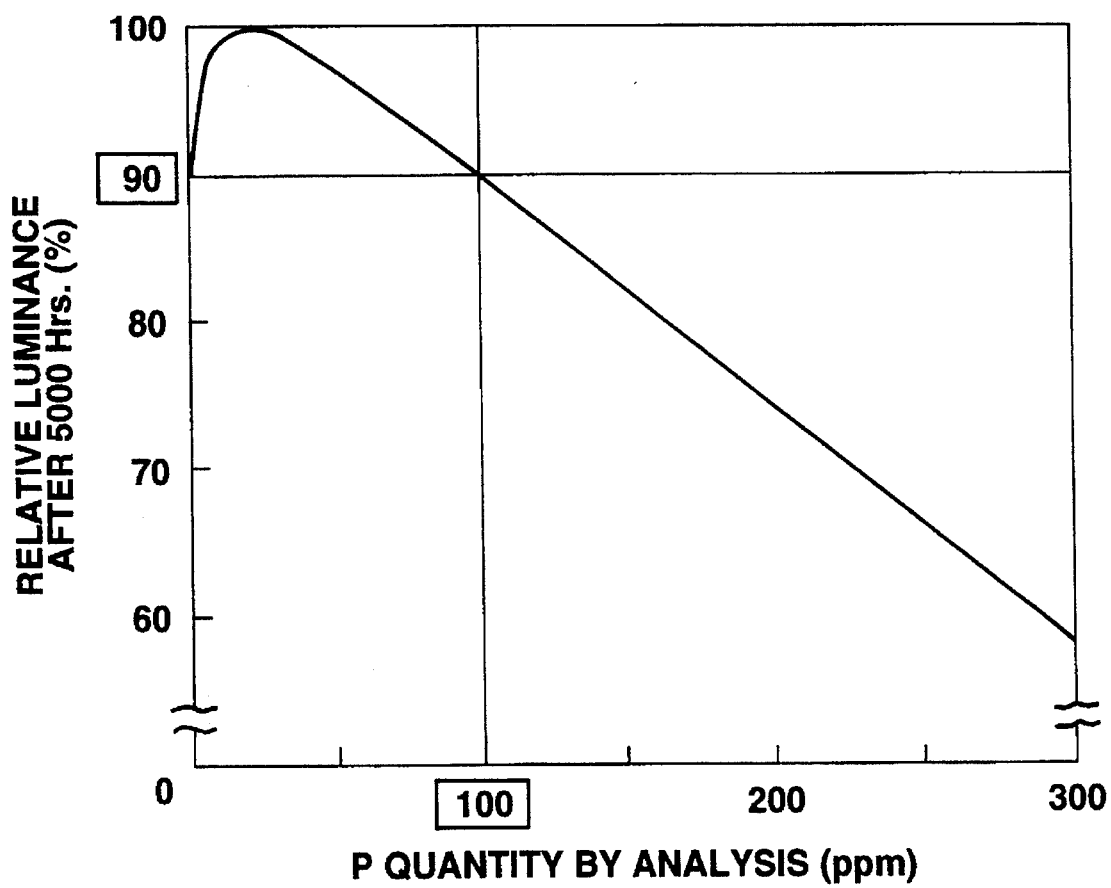
FIG. 6 is a graphical representation showing a content of P in a phosphor of the present invention and luminance of the phosphor after lapse of 5000 hours.

A decrease in Li content, as shown in FIG. 4, tends to cause emission of the phosphor to be carried out in a ultraviolet region, so that the phosphor fails to exhibit satisfactory luminance in a visible region. Thus, in order to permit the phosphor to exhibit luminance at least one half as much as luminance thereof obtained when the Li content is 2300 ppm, it is required that the phosphor contains Li of 500 ppm or more.

A variation in tone of the phosphor depending on the Li content, as shown in FIG. 5, causes a variation in value x to be increased as compared with that in value y. Thus, the Li content was defined by the value y.

Use of $Li_3PO_4$ causes the phosphor to contain P irrespective of the $ZnO/Ga_2O_3$ ratio and the quantity of $Li_3PO_4$ used. However, when a content of P in the phosphor is 100 ppm or more, luminance of the phosphor which has been excited for a long period of time tends to be decreased as compared with luminance thereof obtained when the P content is 100 ppm or less. This is due to the fact that impinge of electrons on the phosphor causes P to be emitted therefrom, which then adheres to a cathode of the fluorescent display device, resulting in the cathode being deteriorated. Thus, it is required to decrease the P content to a level of 100 ppm or less.

As can be seen from the foregoing, the phosphor of the present invention is formed of the $ZnO.Ga_2O_3$ matrix doped with Li and P, wherein the quantity of doping of each of Li and P is set to be within a predetermined range. Such construction of the present invention permits the phosphor to exhibit increased luminance and a stabilized blue tone under low velocity electron excitation conditions.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A low-velocity electron excited phosphor of a blue luminous color consisting essentially of:

a matrix represented by a general formula $ZnO.Ga_2O_3$; and

Li and P each doped in said matrix;

said Li being doped in an amount of 800 to 2300 ppm; and said P being doped in an amount of 80 ppm or less.

2. A low-velocity electron excited phosphor of a blue luminous color as defined in claim 1, wherein a molar ratio between ZnO and $Ga_2O_3$ in said matrix is 0.73–0.87:1.

* * * * *